United States Patent [19]

Barbagli

[11] 4,256,144

[45] Mar. 17, 1981

[54] LEVER CONTROL FOR HYDRAULIC CONTROL CIRCUITS

[75] Inventor: Rino O. Barbagli, Borgaretto, Italy

[73] Assignee: Fiat-Allis Macchine Movimetno Terra S.p.A., Lecce, Italy

[21] Appl. No.: 947,262

[22] Filed: Sep. 29, 1978

[30] Foreign Application Priority Data

Oct. 6, 1977 [IT] Italy ............... 69226 A/77

[51] Int. Cl.³ ............... F16K 11/18; G05G 9/02
[52] U.S. Cl. ............... 137/636.2; 74/471 XY; 91/522
[58] Field of Search ............. 172/182; 137/636, 636.2; 91/521, 522; 74/471 XY

[56] References Cited

U.S. PATENT DOCUMENTS

| | | | |
|---|---|---|---|
| 3,388,609 | 6/1968 | Miller | 74/471 XY |
| 3,700,044 | 10/1972 | Berg | 172/804 |
| 3,768,328 | 10/1973 | Campbell | 74/471 XY |
| 3,823,647 | 7/1974 | Campbell et al. | 91/522 |
| 3,854,380 | 12/1974 | Casey | 91/521 |
| 3,943,791 | 3/1976 | Casey | 137/636.2 |
| 4,169,443 | 10/1979 | Todeschini | 74/471 XY |

*Primary Examiner*—Martin P. Schwadron
*Assistant Examiner*—A. Michael Chambers
*Attorney, Agent, or Firm*—Robert A. Brown

[57] ABSTRACT

A single lever control system for controlling the operation of multiple functions. A single control lever is coupled through linkage to effect individual movement of a plurality of valve spools in a hydraulic system and is supported for movement in predetermined paths to effect operation of the controls for the hydraulic system. Movement of the control lever effects operation of the hydraulic system in response to movement of the lever in a predetermined path.

9 Claims, 9 Drawing Figures

U.S. Patent   Mar. 17, 1981   Sheet 1 of 5   4,256,144
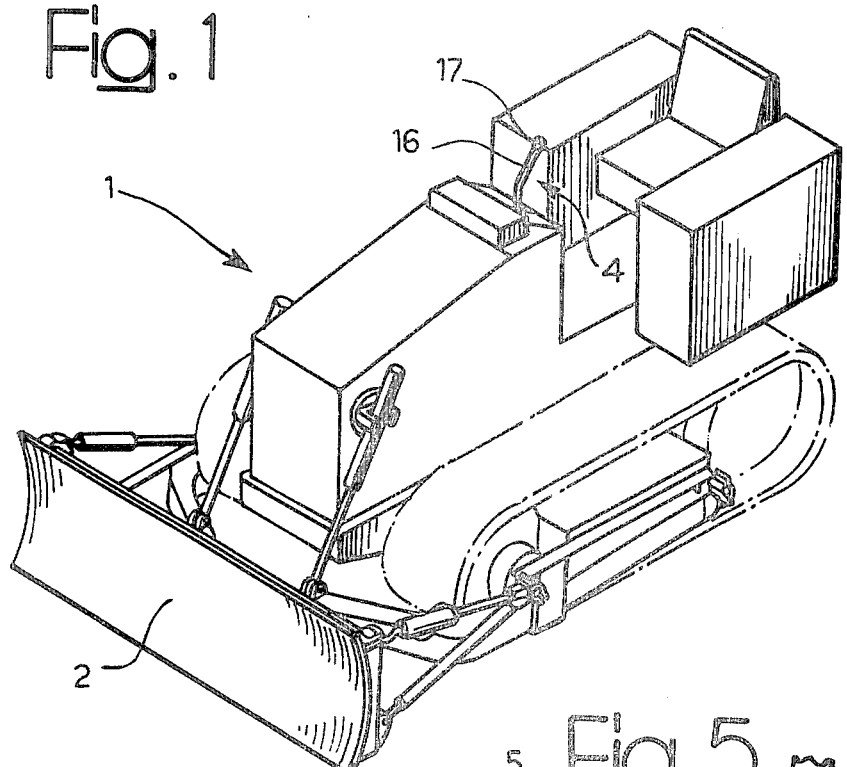
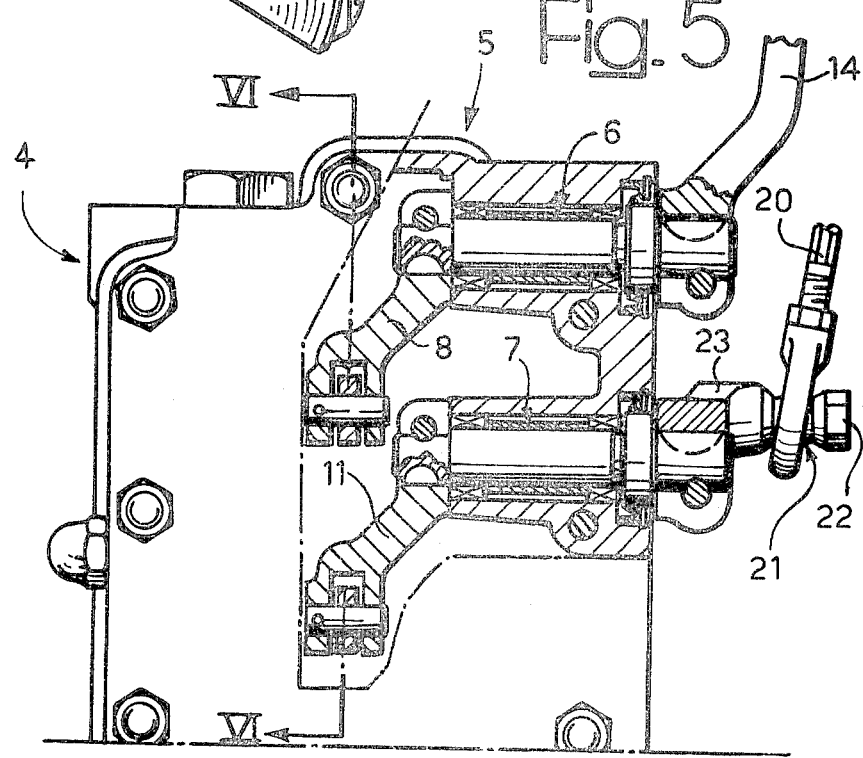

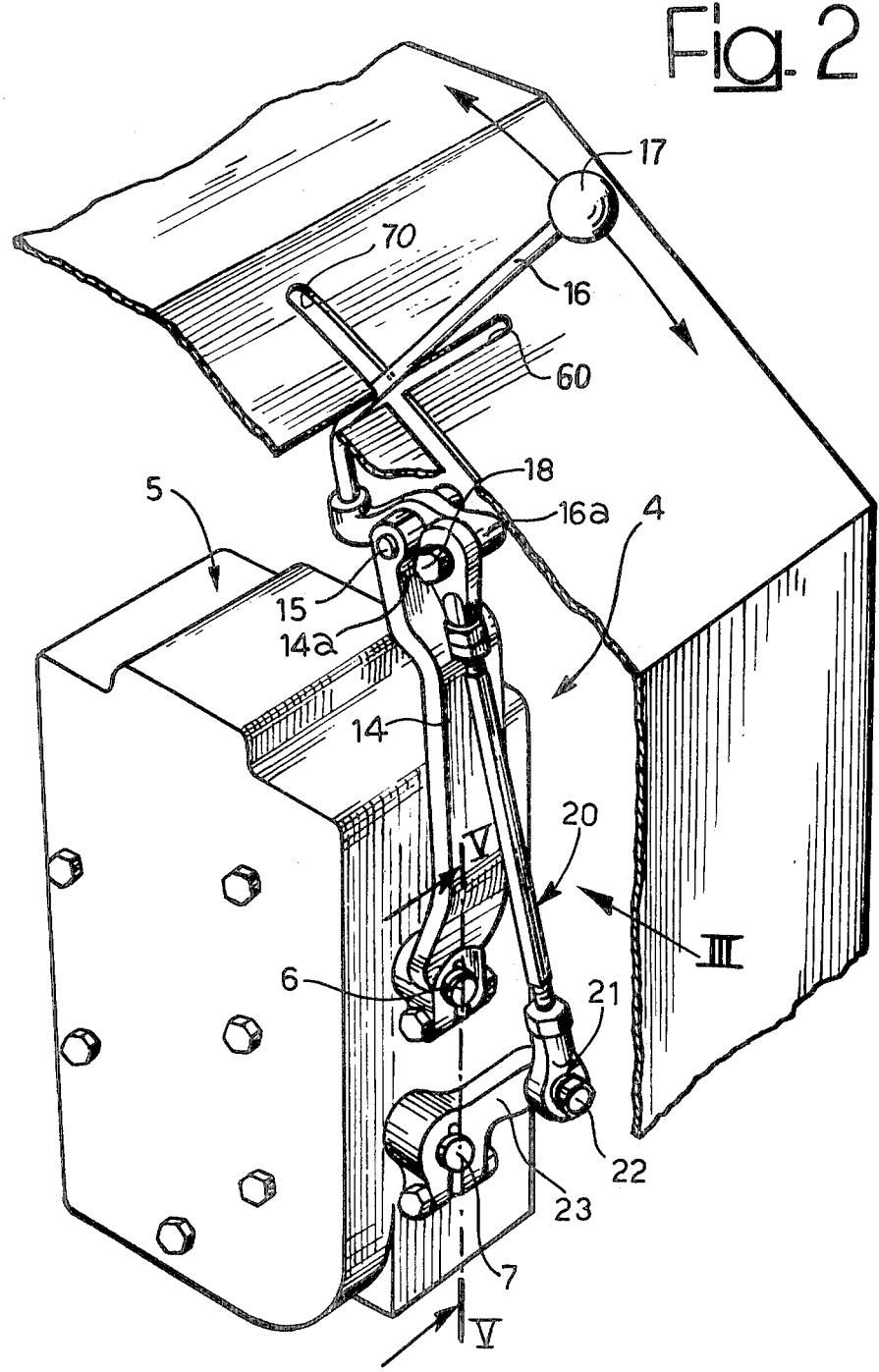

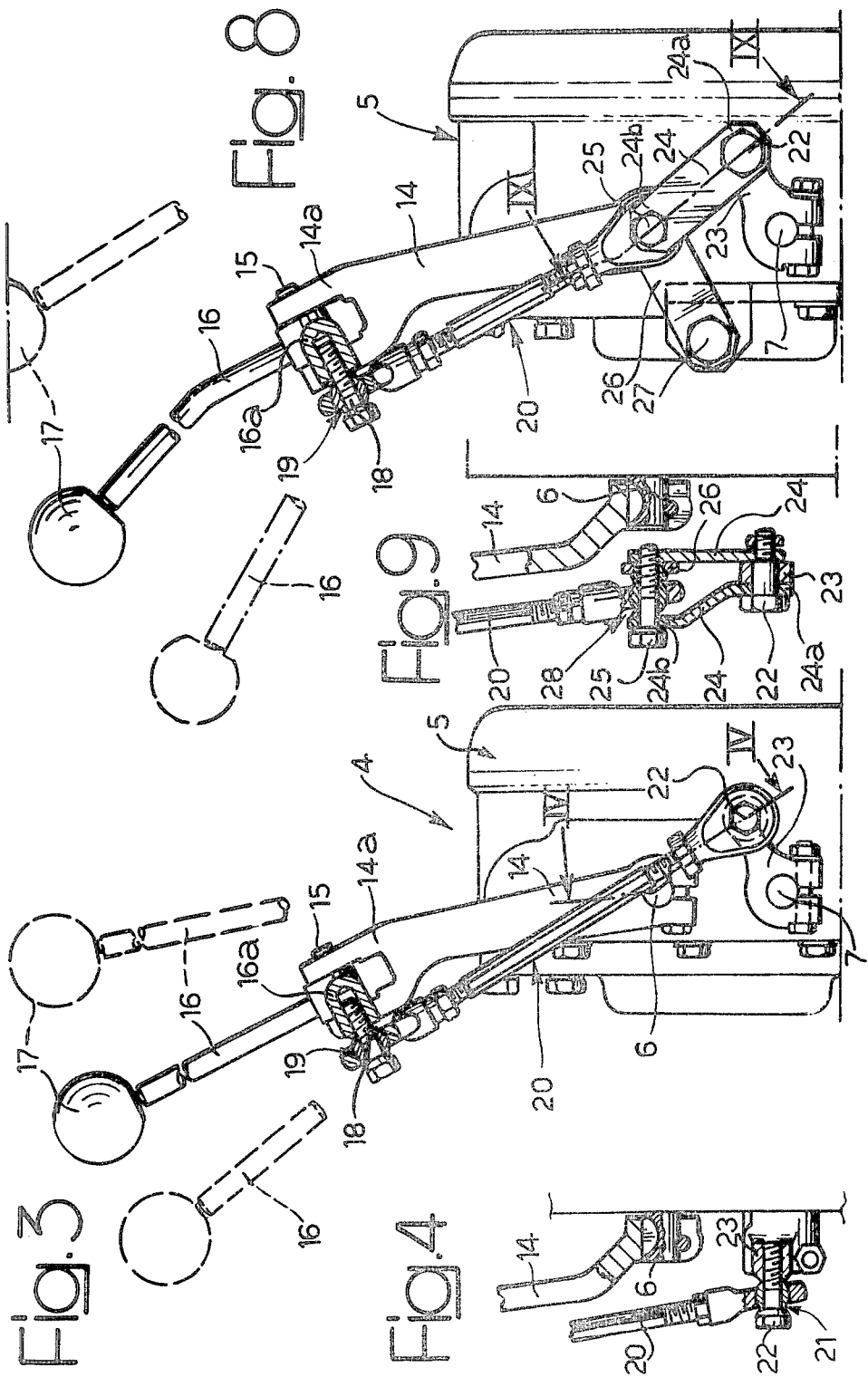

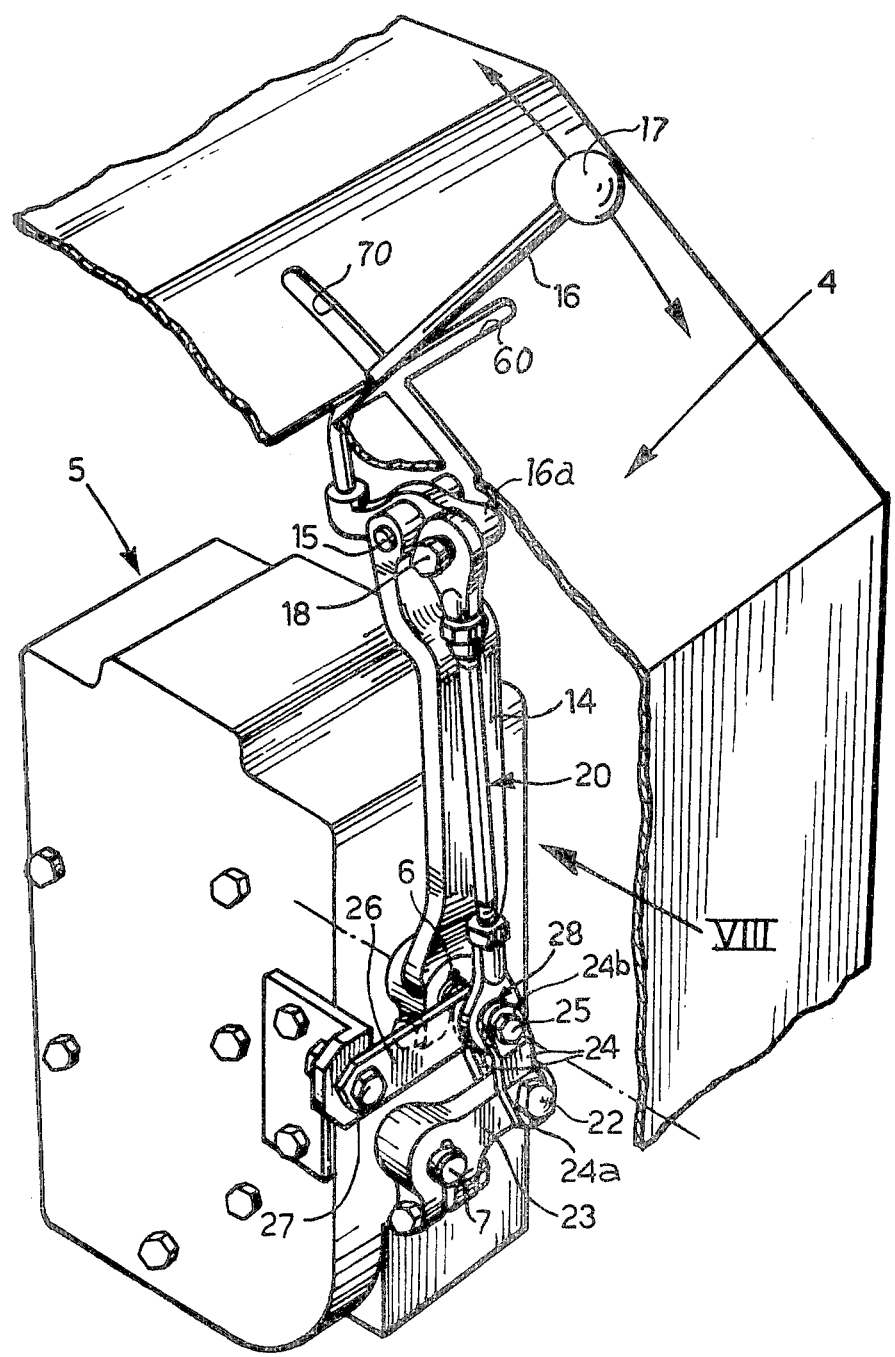

LEVER CONTROL FOR HYDRAULIC CONTROL CIRCUITS

BACKGROUND OF THE INVENTION

This invention relates in general to multi-function control mechanisms and, in particular, to a single lever system for controlling or performing multiple functions.

More specifically, but without restriction to the particular use which is shown and described, this invention relates to a single lever control for selectively actuating or controlling the operation of accessory hydraulic equipment associated with a vehicle.

In the operation of auxiliary equipment associated with, for example, an earthmoving vehicle such as a dozer blade equipped crawler tractor, a number of operations are required to control the vehicle as well as to effect the many different positioning adjustments required to effectively use the auxiliary equipment. To perform these multiple control functions for the earthmoving vehicle, as well as the auxiliary equipment, control levers are provided for effecting each separate function. Separate control levers to operate each functional movement results in a large number of control levers creating lever mounting problems due to space requirements and transmitting a substantial amount of noise into the vehicle cab. As the number of control levers increases they become a potential source of confusion and, therefore, a hazard to the machine operator's safety.

In order to minimize the number of levers required to control the vehicle and the auxiliary equipment, control levers capable of controlling multiple functions have been utilized. These control systems minimize the number of individual control levers required by using a single lever to selectively actuate a multiple of controlled functions. In this manner the single multi-function control lever can actuate related functions of the vehicle and/or auxiliary equipment. Such control is of particular importance in controlling the flow of hydraulic fluid through the various fluidic circuits utilized in earthmoving equipment.

Control lever systems for controlling multiple functions which have been utilized previously, such as disclosed in U.S. Pat. Nos. 3,700,044 and 3,854,380, generally require compound linkages and/or pivotal connections involving complex linkage to accomplish the multi-function control. Other systems require a resilient boot to seal out objectional noises transmitted through the control mechanism and to present an acceptable appearance. These resilient boots quickly deteriorate loosing their noise damping capabilities and become objectional in appearance. The present invention is an improved uni-lever, multiple-functioning control mechanism which eliminates the necessity of complex or compound linkage as well as a noise dampening boot.

SUMMARY OF THE INVENTION

It is, therefore, an object of this invention to improve single lever controls for effecting multiple functions. Another object of this invention is to improve the structure of a single lever control system for effecting operation of hydraulic controls.

These and other objects are attained in accordance with the present invention wherein there is provided a single lever control system for controlling the operation of multiple functions. A single control lever is coupled through linkage to effect individual movement of a plurality of valve spools in a hydraulic system and is supported for movement in predetermined paths to effect operation of the controls for the hydraulic system. Movement of the control lever effects operation of the hydraulic system in response to movement of the lever in a predetermined path.

DESCRIPTION OF THE DRAWINGS

Further objects of the invention, together with additional features contributing thereto and advantages accruing therefrom will be apparent from the following description of one embodiment of the invention when read in conjunction with the accompanying drawings, wherein:

FIG. 1 is a schematic perspective view of an earthmoving machine, commonly referred to as a crawler tractor, which is provided with a lever control device constructed in accordance with the present invention;

FIG. 2 is an enlarged perspective view of the control lever system;

FIG. 3 is a frontal view of the apparatus shown in FIG. 2 taken in the direction of the arrow III;

FIG. 4 is a sectional view taken along line IV—IV of FIG. 3;

FIG. 5 is a partial sectional view taken along line V—V of FIG. 2;

FIG. 7 is an enlarged frontal perspective view of an alternative embodiment of the lever control system;

FIG. 8 is a frontal view of the apparatus shown in FIG. 7 taken in the direction of the arrow VIII; and FIG. 9 is a sectional view taken along line IX—IX of FIG. 8.

DESCRIPTION OF THE PREFERRED EMBODIMENT

Figure 6:
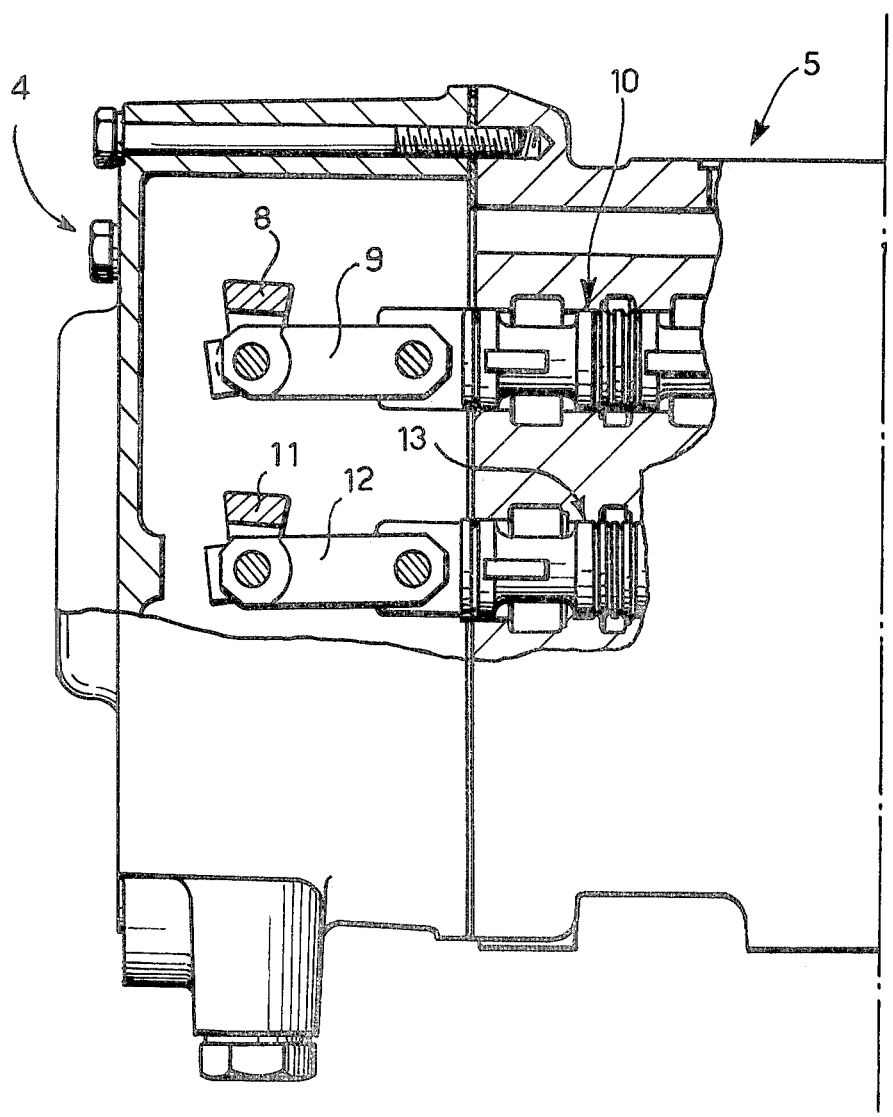
FIG. 6 is a sectional view taken along line VI—VI of FIG. 5.

Referring now to FIG. 1, there is shown an earthmoving vehicle commonly referred to as a crawler tractor 1 having a dozer blade 2 the movement of which is controlled by the machine operator through operation of a generally C-shaped control lever 16. Movement of the control lever 16 coupled through appropriate linkage to be hereinafter described in detail effects the flow of hydraulic fluid through a distributor valve 4, best shown in FIGS. 5 and 6.

The distributor valve 4 comprises a housing 5 in the interior of which is formed a plurality of conduits for the circulation of hydraulic fluid which is used to control the movement of hydraulic cylinders to jacks which are operatively connected to the scraper tool or dozer blade 2. Flow of hydraulic fluid to control movement of the dozer blade 2 is effected by displacement of control valve spools 10 and 13 which are reciprocable within the housing 5 to control the flow of hydraulic fluids through various fluid circuits. The translatory movement of the valve spools 10 and 13 is effected by rotational or pivotal movement of control shafts 6 and 7, respectively, which extend through an outer wall into the housing 5 wherein they are rotatably journaled by suitable bearing surfaces. The internal end of the control shaft 6 has a crank arm 8 secured thereto which is connected at an opposite bifurcated end to the valve spool 10 by means of a connecting link secured to and extending between the valve spool 10 and the crank arm 8. Similarly, the internal end of the control shaft 7 has a crank arm 11 secured thereto which is connected at an opposite bifurcated end to the valve spool 13 by means of a small link 12 secured to and extending between the valve spool 13 and the crank arm 11. Movement of the valve spools 10 and 13, respectively, is therefore effected by rotational or pivotal movement of the control shaft 6 and 7, respectively.

Rotational movement of the control shaft 6 is effected by movement of a radial arm 14 connected at one end to the outboard end of shaft 6 which extends out of the housing 5. The radial arm 14 has a bifurcated free end 14a across which is secured a pivot pin 15, the longitudinal axis of which lies in a plane extending perpendicular or normal to the two longitudinal axes of the control shafts 6 and 7. The pivot pin 15 provides a bearing surface for pivotal movement of the control lever 16 in the direction of the arrow shown in FIGS. 2 and 7. The pivot pin 15 passes through an appendix portion 16a of the control lever 16 to permit the control lever to pivot about the longitudinal axis thereof. The free or distal end of the control lever 16 is provided with a knob 17 for ease of operator movement. The free or distal end of the appendix portion 16a extends beyond the pivot connection with pivot pin 15 and has a screwbolt or pin 18 threadingly secured thereto.

As best shown in FIGS. 3 and 8, on the body of the screwbolt 18 there is pivoted, by means of a universal ball joint 19, one end of a connecting rod 20. The opposite end of the connecting rod 20 is in turn pivotally connected through another universal ball joint 21 to the body of a threaded screwbolt or pin 22 which is best shown in FIGS. 4 and 9. The threaded end of the pin 22 is fixed to the free end of a radial arm 23 which extends radially outward from an opposite end fixedly secured to the outboard end of the control shaft 7 which extends out of the housing 5.

Linear or sliding movement of the valve spool 10 is effected by pivotal movement of the control arm 16 in slot 60. Such movement of the control arm 16 effects a similar movement of the radial arm 14 which thereby rotates the control shaft 6 and through the previously disclosed linkage, effects linear motion of the valve spool 10. Rotational movement of the control lever 16, along a circular trajectory defined by slot 60 defines a path of movement the center of rotation of which is coaxial with the longitudinal axis of the control shaft 6.

In order for such movement not to produce simultaneous and undesired movement of the radial arm 23 which extends outwardly from the control shaft 7, the center of rotation of the trajectory or path of movement of the pivot pin 15 is designed to be coincident with or coaxial with the longitudinal axis of threaded pin 22 which is secured to the outer end of the radial arm 23. Consequently, during the movement of the radial arm 14 the amount of displacement of the radial arm 23 will be dependent upon the distance between the longitudinal axis of threaded pin 22 and the longitudinal axis of the control shaft 6. To minimize such distance the connecting rod 20 is disposed so that the longitudinal axis thereof passes through the longitudinal axis of the control shaft 6 when the radial arm 14 is substantially at the midpoint of its stroke or at the position where slots 60 and 70 intersect as is approximately shown by the continuous line in FIG. 2.

Referring now to FIGS. 3 and 8, the control lever 16 is shown in full outline in such an intermediate position and in dashed outline in its extreme positions. In the intermediate position the connecting rod 20 is disposed such that its longitudinal axis substantially, but yet not completely, is intersected by the longitudinal axis of the control shaft 6.

In order to effect linear movement of the control valve spool 13, the radial arm 23 is rotated to thereby rotate control shaft 7 and, through the previously described linkage, effect linear movement of the valve spool 13. The machine operator displaces control lever 16 in slot 70 and thereby rotates or rocks the control lever 16 about the pivot pin 15. The control lever 16 thereby moves in a trajectory or path of movement which lies in a plane which is parallel or coincident with the longitudinal axes of the control shafts 6 and 7.

Although the movement of the radial arm 23 may be substantially eliminated during movement of the control lever 16 in slot 60 by positioning the connecting rod 20 in the manner previously described, when it is desired to avoid any such movement of the radial arm 23 the alternative embodiment disclosed in FIGS. 7, 8 and 9 may be used wherein like reference numerals indicate corresponding parts throughout. In this embodiment two parallel side rods or plates 24 are pivotally connected to the threaded pin 22 at one end 24a. The opposite ends 24b of the side plates 24 are connected by means of a threaded pin 25 passing therethrough and having positioned therebetween the free end of a crank arm 26. The crank arm 26 is rotatable about a pivot pin 27 secured to the housing 5 by means of an appropriate bracket. In this embodiment the end of the connecting rod 20 which is opposite to the threaded screwbolt 18 is pivoted to the central body of the pin 25 by means of a spherical ball joint 28. The pin 25 is carried coaxially with the control shaft 6 so that rotation of the radial arm 14 does not produce any movement of the radial arm 23. In the preferred embodiment the oscillating rod 24 is disposed transversely either with respect to the radial arm 23 or with respect to the crank arm 26 so as to form a substantially right or 90° angle with the crank arm 25.

In the event it is desired to use the control system disclosed herein for effecting movement or functions which require the pivotal actuation of both control shafts 6 and 7, a modification to the housing that is shown in FIGS. 2 and 7 is required. To effect such simultaneous movement, the control lever 16 must be capable of movement in horizontal and vertical paths that are not limited to the slots 60 and 70, respectively. Therefore, if such actuation of the control shafts 6 and 7 is desired, the slots 60 and 70 formed in the housing are eliminated and an opening is formed therein which is of a size defined by the outer limits of both slots. In this manner the control lever 16 can be sequentially moved in a horizontal and vertical direction to actuate control shaft 6 or 7, respectively. The control lever 16, for example, can first be moved to a horizontal position then in a vertical position thereby sequentially pivoting both the control shaft 6 and 7, respectively. The movements or functions which actuation of the control shaft 6 and 7 effects, can thereby be responsive to the horizontal and vertical coordinates to which the control lever 16 is moved.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A lever control for effecting the actuation of control valves operable to control the flow of pressurized hydraulic fluid in fluidic circuits comprising at least two control valves each separably movable for controlling the flow of hydraulic fluid in a fluidic circuit, at least two rotatable control shafts each mutually exclusively operatively connected to one of said control valves for effecting hydraulic fluid flow controlling movement thereof in response to rotational movement of one of the control shafts, a control lever movable in at least two separate paths of movement for effecting mutually exclusive rotational movement of said rotatable control shafts, a radial arm secured to each of said rotatable control shafts and extending outwardly therefrom for effecting rotational movement thereof, a first one of said radial arms terminating in a bifurcated distal end portion and having pivotal support forming means extending between the bifurcated end portion, said control lever supported upon said pivotal support forming means for pivotal movement relative thereto and having a distal end extending outward therefrom, said first one of said radial arms movable to effect rotational movement of said rotatable control shaft secured thereto in response to movement of said control lever in a first path of movement, a second one of said radial arms secured to the other of said rotatable control shafts and extending outwardly therefrom and being operatively connected to the distal end of said control lever which extends outwardly from said pivotal support forming means between said control lever and said first one of said radial arms, and said second one of said radial arms movable to effect rotational movement of said rotatable control shaft secured thereto in response to movement of said control lever in a second path of movement.

2. The apparatus of claim 1 further including a connecting rod extending between the distal end of said second radial arm and the distal end of said control lever to effect rotational movement of one of said control shafts upon pivotal movement of said lever about said pivotal support forming means.

3. The apparatus of claim 2 wherein the axis of rotation of said rotatable control shaft secured to said first radial arm intersects said connecting rod to inhibit rotational movement of said rotatable control shaft secured to said second radial arm during movement of said control lever in said first path of movement.

4. The apparatus of claim 1 wherein movement of said control lever in said first path of movement effects a parallel path of movement of said first radial arm to effect rotational movement of said rotatable control shaft secured thereto.

5. The apparatus of claim 1 wherein movement of said control lever in said second path of movement is in a plane parallel to the axis of rotation of said rotatable control shaft secured to said second radial arm.

6. The apparatus of claim 1 further including
   a connecting rod extending between the distal end of said control lever to a position coincident with the axis of rotation of said rotatable control shaft secured to said first radial arm, a crank arm coupled to the distal end of said connecting rod at one end and pivotally secured upon a fixed support at the opposite end to support the distal end of said connecting rod, and connecting means operatively connected between said distal end of said connecting rod and said second radial arm to prevent rotational movement of said second radial arm upon movement of said control lever in said first path of movement.

7. The apparatus of claims 2 or 6 wherein the distal end of said connecting rod is formed with a spherical ball joint to facilitate controlled pivotal movement of said second radial arm.

8. The apparatus of claim 6 wherein said crank arm and said connecting means are positioned at substantially right angles to each other.

9. The apparatus of claim 1 wherein each of said control valves is supported for linear movement, and further including crank arm means secured at one end to an inboard end of each of said rotatable control shafts for rotational movement thereby, and
   coupling means extending between a free end of each of said crank arm and said linearly movable control valve to effect linear movement thereof.

* * * * *